UNITED STATES PATENT OFFICE.

THOMAS INGHAM, OF LIVERPOOL, ENGLAND.

MANUFACTURE OF PRODUCTS FROM SEAWEED.

1,162,926.     Specification of Letters Patent.     Patented Dec. 7, 1915.

No Drawing.     Application filed June 13, 1914. Serial No. 845,008.

*To all whom it may concern:*

Be it known that I, THOMAS INGHAM, a subject of the King of Great Britain, and a resident of Liverpool, England, have invented certain new and useful Improvements in the Manufacture of Products from Seaweed, of which the following is a specification.

A substance possessing acid properties and known as alginic acid can, as is known, be extracted from various species of seaweed, among others from *Laminaria, Stenophylla* and *Fucus vesiculosus;* and compounds of this acid, which are soluble in water, are now commercial products.

In addition to the simple salts of alginic acid which are soluble in water, such as those of sodium, potassium, ammonium and magnesium, there are others represented by the alginates of aluminium, zinc, iron, cadmium, copper and the like, which are insoluble in that menstruum. Many of these, however, it is known can be obtained in aqueous solution by suitable treatment with an alkali, such for example as ammonia, soda, or potash, or even in some cases with the carbonates of these bases. The solvent action of aqueous solutions of these alkalis upon the insoluble salts above referred to, appears to be primarily due to the formation of soluble double alginates, such for example as ammonium aluminium alginate, ammonium copper alginate, and the like. These soluble double salts have numerous technical applications, and the present invention has reference to improvements in their manufacture in a form suitable for their use on a technical or commercial scale.

One method hitherto adopted for the preparation of solutions of the double salts above described has been carried out in several successive stages, one of which has been directed to the precipitation of a more or less impure variety of insoluble alginate which has been subsequently separated by any convenient method—such as filtration, sedimentation, or the like, with or without washing—followed by an after treatment of the body so obtained with a solution of the particular alkali which it has been desired to employ for the purpose of bringing it into solution. Another method adopted for their preparation consists in the addition of a soluble salt of a suitable metal to a solution of a soluble salt of alginic acid whereby an insoluble metallic alginate is precipitated. To the whole mass of liquid and precipitate so obtained the desired caustic alkali or alkali carbonate, or ammonia, is added to bring about the solution of the precipitate. Both these known methods involve the precipitation of an insoluble alginate, with the difference that while in one the precipitated alginate is mechanically separated, by filtration or otherwise, before being dissolved in the alkalis mentioned, in the other the precipitate is not so separated previous to its being brought into solution with an alkali. It has been found, however, that equally serviceable and technically valuable solutions of the above described double alginates can be more economically obtained by a simpler and more efficacious method of working than that of precipitation and solution of the insoluble alginates.

According to this invention, the soluble double alginates are prepared as follows: The solution obtained by extracting the seaweed with alkali as ordinarily practised, or an aqueous solution of alginate of soda or other soluble alginate, is treated with any suitable desired excess of alkali hydroxid or carbonate, such for example as aqueous ammonia, soda, or potash, or the carbonates of these bases. To the alkaline solution thus prepared is added sufficient of a solution of a soluble salt of aluminium, zinc, cadmium, copper, iron, or other suitable metal in quantity which would be sufficient, in the absence of the alkali previously added, to precipitate the whole of the alginic acid present in the soluble alginate solution, but which precipitation is prevented by the presence of the excess of alkali. Working under these conditions, no precipitation of alginate occurs, but owing to the simultaneous presence of the necessary alkali, a clear and very viscous solution of soluble double alginate is directly obtained in a single operation, and is capable of being at once applied to a number of technical purposes.

It is to be understood that in applying the above processes of manufacturing solutions of the soluble double alginates, mixtures of the various caustic alkalis and alkali metal carbonates, or of the various metallic salts named, may be used, and that in order to facilitate the different operations, they may be carried out at a high temperature when found to be desirable.

The following are examples of suitable mixtures, although it is not intended that the quantities of material stated shall admit of no variation. They may, in fact, be considerably modified to suit varying requirements in accordance with the foregoing description.

For the production of double alginate of zinc and alkali metal; one fluid ounce of ammonia solution of 0.880 specific gravity is added to each ten ounces of alkali metal alginate solution of ten per cent. strength and thoroughly mixed therewith. To the solution prepared in this manner is added one ounce of sulfate of zinc which has been previously dissolved in about two ounces of water.

For the production of double alginate of aluminium and alkali metal; one fluid ounce of ammonia solution of 0.880 specific gravity is added to each ten ounces of alkali metal alginate solution of ten per cent. strength and thoroughly mixed therewith. To the solution prepared in this manner is added one ounce of sulfate of alumina or of alum which has been previously dissolved in about five ounces of water.

For the production of double alginate of copper and alkali; one fluid ounce of ammonia solution of 0.880 specific gravity is added to each one pound of ten per cent. solution of alkali alginate, and thoroughly mixed therewith. To the solution prepared in this manner is added one ounce of sulfate of copper which has been previously dissolved in about five ounces of water.

Any of the solutions prepared as above are in a condition to be applied at once to the paper, fabric, or other material by any suitable known methods for applying glue, gelatin, or other similar sizing materials, which may be subsequently dried either by passing over heated cylinders or by subjecting it to the action of a current of warm air. If desired, several coatings of the solutions as prepared above may be applied to the fabric or other material, in which case it will be necessary to dry the material after each coating.

In carrying out the foregoing method of treating paper or other fabric, ammonia escapes during the drying process, and a coating of double alginate of alkali and zinc, aluminium, or copper—according to the salt employed—remains upon the material treated. The metallic alginates thus formed are sufficiently insoluble in water to resist its solvent action. If, however, the material is required to be quite water repellent, or to have a more lustrous or glossy finish imparted to it, substances such as wax, tallow, or linseed oil may be incorporated with the alginate mixture in the proportion of about two ounces to each gallon.

The materials to be treated with solutions prepared in accordance with the above described process include textile materials, woven, textile fabrics, paper, pasteboard, cardboard, leather, or other absorbent materials.

The advantage of preparing and applying an alginate solution as described lies in the fact that when the fabric or other material is treated with the solution, the precipitation of the metallic salts takes place gradually during the operation of drying the treated material, this operation being carried out at any temperature usually employed for drying the particular fabric or material.

I claim:—

1. The process of preparing soluble double metallic alginates in a form suitable for technical purposes which consists in treating an alginate solution with an excess of a suitable alkaline body and then adding sufficient of a solution of a soluble metallic salt which in the absence of such excess would precipitate the whole of the alginic acid present in the mixture.

2. The process of preparing soluble double metallic alginates in a form suitable for technical purposes which consists in treating an alginate solution with an excess of an alkali, and then adding sufficient of a solution of a soluble metallic salt which in the absence of such excess would precipitate the whole of the alginic acid present in the mixture.

3. The process of preparing soluble double metallic alginates in a form suitable for technical purposes which consists in treating an alginate solution with an excess of a solution of ammonia, and then adding sufficient of a solution of a soluble metallic salt which in the absence of such excess of ammonia solution would precipitate the whole of the alginic acid present in the mixture.

In testimony whereof I affix my signature in presence of two witnesses.

THOMAS INGHAM.

Witnesses:
A. J. DAVIES,
R. S. JONES.